US010567482B2

United States Patent
Ram et al.

(10) Patent No.: US 10,567,482 B2
(45) Date of Patent: Feb. 18, 2020

(54) ACCESSING ENDPOINTS IN LOGICAL NETWORKS AND PUBLIC CLOUD SERVICE PROVIDERS NATIVE NETWORKS USING A SINGLE NETWORK INTERFACE AND A SINGLE ROUTING TABLE

(71) Applicant: Nicira, Inc., Palo Alto, CA (US)

(72) Inventors: Shashank Ram, Santa Clara, CA (US);
Sairam Venugopal, San Mateo, CA (US); Yin Lin, Mountain View, CA (US); Anand Kumar, Sunnyvale, CA (US); Nithin Bangalore Raju, Santa Clara, CA (US); Mukesh Hira, Los Altos, CA (US); Ganesan Chandrashekhar, Campbell, CA (US); Vivek Agarwal, Campbell, CA (US)

(73) Assignee: NICIRA, INC., Palo Alto, CA (US)

( * ) Notice: Subject to any disclaimer, the term of this patent is extended or adjusted under 35 U.S.C. 154(b) by 182 days.

(21) Appl. No.: 15/686,093

(22) Filed: Aug. 24, 2017

(65) Prior Publication Data

US 2019/0068689 A1 Feb. 28, 2019

(51) Int. Cl.
*H04L 29/08* (2006.01)
*H04L 12/931* (2013.01)
(Continued)

(52) U.S. Cl.
CPC .............. *H04L 67/10* (2013.01); *H04L 49/70* (2013.01)

(58) Field of Classification Search
CPC .................................. H04L 67/10; H04L 49/70
See application file for complete search history.

(56) References Cited

U.S. PATENT DOCUMENTS 6,108,300 A 8/2000 Coile et al.
6,832,238 B1 12/2004 Sharma et al.
(Continued)

FOREIGN PATENT DOCUMENTS

EP 1742430 A1 1/2007
WO 2018044341 A1 3/2018
(Continued)

OTHER PUBLICATIONS

Firestone, Daniel, "VFP: A Virtual Switch Platform for Host SDN in the Public Cloud," 14th USENIX Symposium on Networked Systems Design and Implementation, Mar. 27-29, 2017, 15 pages, USENIX, Boston, MA, USA.

(Continued)

*Primary Examiner* — Andrew Lai
*Assistant Examiner* — Harry H Kim
(74) *Attorney, Agent, or Firm* — Adeli LLP

(57) ABSTRACT

A physical host machine of a public cloud system includes a set of processing units for executing instructions stored in non-transitory machine readable media. The physical host machine also includes a physical network interface cars (PNIC) and a non-transitory machine readable medium that stores a data compute node (DCN). The DCN includes first and second applications, first and second logical interfaces, a network stack, and a managed forwarding element (MFE). The first application is connected to the pNIC through the network stack, the first logical interface, and the MFE. The second application is connected to the PNIC through the network stack, the second logical interface, and the MFE.

18 Claims, 10 Drawing Sheets

(51) Int. Cl.
*H04L 12/24* (2006.01)
*H04L 29/06* (2006.01)
*G06F 9/455* (2018.01)

(56) References Cited

U.S. PATENT DOCUMENTS

| | | | |
|---|---|---|---|
| 7,107,360 B1 | 9/2006 | Phadnis et al. | |
| 7,423,962 B2 | 9/2008 | Auterinen | |
| 7,953,895 B1 | 5/2011 | Narayanaswamy et al. | |
| 8,296,434 B1 | 10/2012 | Miller et al. | |
| 8,902,743 B2 | 12/2014 | Greenberg et al. | |
| 8,958,293 B1 | 2/2015 | Anderson | |
| 9,244,669 B2 | 1/2016 | Govindaraju et al. | |
| 9,356,866 B1 | 5/2016 | Sivaramakrishnan et al. | |
| 9,413,730 B1 | 8/2016 | Narayan et al. | |
| 9,485,149 B1 | 11/2016 | Traina et al. | |
| 9,519,782 B2 | 12/2016 | Aziz et al. | |
| 9,590,904 B2 | 3/2017 | Heo et al. | |
| 9,699,070 B2 | 7/2017 | Davie et al. | |
| 9,832,118 B1 | 11/2017 | Miller et al. | |
| 9,871,720 B1 | 1/2018 | Tillotson | |
| 10,135,675 B2 | 11/2018 | Yu et al. | |
| 10,193,749 B2 | 1/2019 | Hira et al. | |
| 10,228,959 B1 | 3/2019 | Anderson et al. | |
| 10,333,959 B2 | 6/2019 | Katrekar et al. | |
| 10,341,371 B2 | 7/2019 | Katrekar et al. | |
| 10,367,757 B2 | 7/2019 | Chandrashekhar et al. | |
| 2002/0062217 A1 | 5/2002 | Fujimori | |
| 2002/0199007 A1 | 12/2002 | Clayton et al. | |
| 2007/0186281 A1 | 8/2007 | McAlister | |
| 2007/0226795 A1 | 9/2007 | Conti et al. | |
| 2007/0256073 A1 | 11/2007 | Troung et al. | |
| 2010/0318609 A1 | 12/2010 | Lahiri et al. | |
| 2011/0317703 A1 | 12/2011 | Dunbar et al. | |
| 2012/0082063 A1 | 4/2012 | Fujita | |
| 2013/0044636 A1 | 2/2013 | Koponen et al. | |
| 2013/0044641 A1 | 2/2013 | Koponen et al. | |
| 2013/0058208 A1 | 3/2013 | Pfaff et al. | |
| 2013/0125230 A1 | 5/2013 | Koponen et al. | |
| 2013/0198740 A1 | 8/2013 | Arroyo et al. | |
| 2013/0263118 A1 | 10/2013 | Kannan et al. | |
| 2013/0297768 A1 | 11/2013 | Singh | |
| 2013/0304903 A1 | 11/2013 | Mick et al. | |
| 2013/0318219 A1 | 11/2013 | Kancherla | |
| 2014/0010239 A1 | 1/2014 | Xu et al. | |
| 2014/0052877 A1 | 2/2014 | Mao | |
| 2014/0108665 A1 | 4/2014 | Arora et al. | |
| 2014/0143853 A1 | 5/2014 | Onodera | |
| 2014/0156818 A1 | 6/2014 | Hunt | |
| 2014/0226820 A1 | 8/2014 | Chopra et al. | |
| 2014/0245420 A1 | 8/2014 | Tidwell et al. | |
| 2014/0280961 A1 | 9/2014 | Martinez et al. | |
| 2014/0317677 A1 | 10/2014 | Vaidya et al. | |
| 2014/0337500 A1 | 11/2014 | Lee | |
| 2014/0376560 A1 | 12/2014 | Senniappan et al. | |
| 2015/0016286 A1 | 1/2015 | Ganichev et al. | |
| 2015/0052522 A1 | 2/2015 | Chanda et al. | |
| 2015/0063360 A1 | 3/2015 | Thakkar et al. | |
| 2015/0096011 A1 | 4/2015 | Watt | |
| 2015/0098465 A1 | 4/2015 | Pete et al. | |
| 2015/0103838 A1* | 4/2015 | Zhang | H04L 45/04 370/401 |
| 2015/0106804 A1 | 4/2015 | Chandrashekhar et al. | |
| 2015/0124645 A1 | 5/2015 | Yadav et al. | |
| 2015/0128245 A1 | 5/2015 | Brown et al. | |
| 2015/0139238 A1 | 5/2015 | Pourzandi et al. | |
| 2015/0163145 A1 | 6/2015 | Pettit et al. | |
| 2015/0172183 A1 | 6/2015 | DeCusatis et al. | |
| 2015/0172331 A1 | 6/2015 | Raman | |
| 2015/0263983 A1 | 9/2015 | Brennan et al. | |
| 2015/0263992 A1* | 9/2015 | Kuch | H04L 49/354 709/225 |
| 2015/0264077 A1 | 9/2015 | Berger et al. | |
| 2015/0271303 A1 | 9/2015 | Neginhal et al. | |
| 2015/0281098 A1* | 10/2015 | Pettit | H04L 45/64 370/235 |
| 2015/0295800 A1 | 10/2015 | Bala et al. | |
| 2015/0373012 A1 | 12/2015 | Bartz et al. | |
| 2016/0055019 A1 | 2/2016 | Thakkar et al. | |
| 2016/0072888 A1* | 3/2016 | Jung | H04L 67/1097 709/219 |
| 2016/0094364 A1 | 3/2016 | Subramaniyam et al. | |
| 2016/0094661 A1 | 3/2016 | Jain et al. | |
| 2016/0105488 A1 | 4/2016 | Thakkar et al. | |
| 2016/0124742 A1 | 5/2016 | Rangasamy et al. | |
| 2016/0134418 A1 | 5/2016 | Liu et al. | |
| 2016/0182567 A1 | 6/2016 | Sood et al. | |
| 2016/0191304 A1 | 6/2016 | Muller | |
| 2016/0274926 A1 | 9/2016 | Narasimhamurthy et al. | |
| 2016/0308762 A1 | 10/2016 | Teng et al. | |
| 2016/0337329 A1 | 11/2016 | Sood et al. | |
| 2016/0352623 A1 | 12/2016 | Jayabalan et al. | |
| 2016/0352682 A1 | 12/2016 | Chang et al. | |
| 2016/0352747 A1 | 12/2016 | Khan et al. | |
| 2016/0364575 A1 | 12/2016 | Caporal et al. | |
| 2017/0006053 A1* | 1/2017 | Greenberg | H04L 63/1425 |
| 2017/0034129 A1 | 2/2017 | Sawant et al. | |
| 2017/0034198 A1 | 2/2017 | Powers et al. | |
| 2017/0060628 A1 | 3/2017 | Tarasuk-Levin et al. | |
| 2017/0091458 A1 | 3/2017 | Gupta et al. | |
| 2017/0091717 A1 | 3/2017 | Chandraghatgi et al. | |
| 2017/0093646 A1 | 3/2017 | Chanda et al. | |
| 2017/0097841 A1 | 4/2017 | Chang et al. | |
| 2017/0099188 A1 | 4/2017 | Chang et al. | |
| 2017/0104365 A1 | 4/2017 | Ghosh et al. | |
| 2017/0111230 A1 | 4/2017 | Srinivasan et al. | |
| 2017/0118115 A1 | 4/2017 | Tsuji | |
| 2017/0126552 A1 | 5/2017 | Pfaff et al. | |
| 2017/0142012 A1 | 5/2017 | Thakkar et al. | |
| 2017/0163442 A1 | 6/2017 | Shen et al. | |
| 2017/0195217 A1 | 7/2017 | Parasmal et al. | |
| 2017/0222928 A1 | 8/2017 | Johnsen et al. | |
| 2017/0223518 A1 | 8/2017 | Upadhyaya et al. | |
| 2017/0279826 A1 | 9/2017 | Mohanty et al. | |
| 2017/0289060 A1 | 10/2017 | Aftab et al. | |
| 2017/0302529 A1 | 10/2017 | Agarwal et al. | |
| 2017/0310580 A1 | 10/2017 | Caldwell et al. | |
| 2017/0324848 A1 | 11/2017 | Johnsen et al. | |
| 2017/0359304 A1 | 12/2017 | Benny et al. | |
| 2018/0006943 A1 | 1/2018 | Dubey | |
| 2018/0013791 A1 | 1/2018 | Healey et al. | |
| 2018/0026873 A1 | 1/2018 | Cheng et al. | |
| 2018/0026944 A1 | 1/2018 | Phillips | |
| 2018/0027012 A1* | 1/2018 | Srinivasan | H04L 63/1466 726/4 |
| 2018/0027079 A1 | 1/2018 | Ali et al. | |
| 2018/0053001 A1 | 2/2018 | Folco et al. | |
| 2018/0062880 A1 | 3/2018 | Yu et al. | |
| 2018/0062881 A1 | 3/2018 | Chandrashekhar et al. | |
| 2018/0062917 A1 | 3/2018 | Chandrashekhar et al. | |
| 2018/0062923 A1 | 3/2018 | Katrekar et al. | |
| 2018/0062933 A1 | 3/2018 | Hira et al. | |
| 2018/0063036 A1 | 3/2018 | Chandrashekhar et al. | |
| 2018/0063086 A1 | 3/2018 | Hira et al. | |
| 2018/0063087 A1 | 3/2018 | Hira et al. | |
| 2018/0063176 A1 | 3/2018 | Katrekar et al. | |
| 2018/0063193 A1 | 3/2018 | Chandrashekhar et al. | |
| 2018/0115586 A1 | 4/2018 | Chou et al. | |
| 2018/0197122 A1 | 7/2018 | Kadt et al. | |
| 2018/0336158 A1* | 11/2018 | Iyer | G06F 13/4282 |
| 2019/0037033 A1 | 1/2019 | Khakimov et al. | |
| 2019/0068493 A1 | 2/2019 | Ram et al. | |

(56) References Cited

U.S. PATENT DOCUMENTS

2019/0173757 A1 6/2019 Hira et al.
2019/0173780 A1 6/2019 Hira et al.

FOREIGN PATENT DOCUMENTS

WO 2019040720 A1 2/2019
WO 2019112704 A1 6/2019

OTHER PUBLICATIONS

International Search Report and Written Opinion of commonly owned International Patent Application PCT/US2018/047706, dated Nov. 15, 2018, 12 pages, International Searching Authority.
Non-published commonly owned International Patent Application PCT/US2018/047706, filed Aug. 23, 2018, 47 pages, Nicira, Inc.
Non-published commonly owned U.S. Appl. No. 15/686,098, filed Aug. 24, 2017, 45 pages, Vicira, Inc.
Author Unknown, "Network Controller," Dec. 16, 2014, 4 pages, available at: https://web.archive.org/web/20150414112014/https://technet.microsoft.com/en-us/library/dn859239.aspx.
Koponen, Teemu, et al., "Network Virtualization in Multi-tenant Datacenters," Proceedings of the 11th USENIX Symposium on Networked Systems Design and Implementation (NSDI'14), Apr. 2-4, 2014, 15 pages, Seattle, WA, USA.
Non-Published commonly Owned U.S. Appl. No. 16/447,872, filed Jun. 20, 2019, 124 pages, Nicira, Inc.
Sunliang, Huang, "Future SDN-based Data Center Network," Nov. 15, 2013, 5 pages, ZTE Corporation, available at http://wwwen.zte.com.cn/endata/magazine/ztetechnologies/2013/no6/articles/201311/t20131115_412737.html.
Wenjie, Zhu (Jerry), "Next Generation Service Overlay Networks," IEEE P1903 NGSON (3GPP Draft), Aug. 22, 2014, 24 pages, IEEE.

* cited by examiner

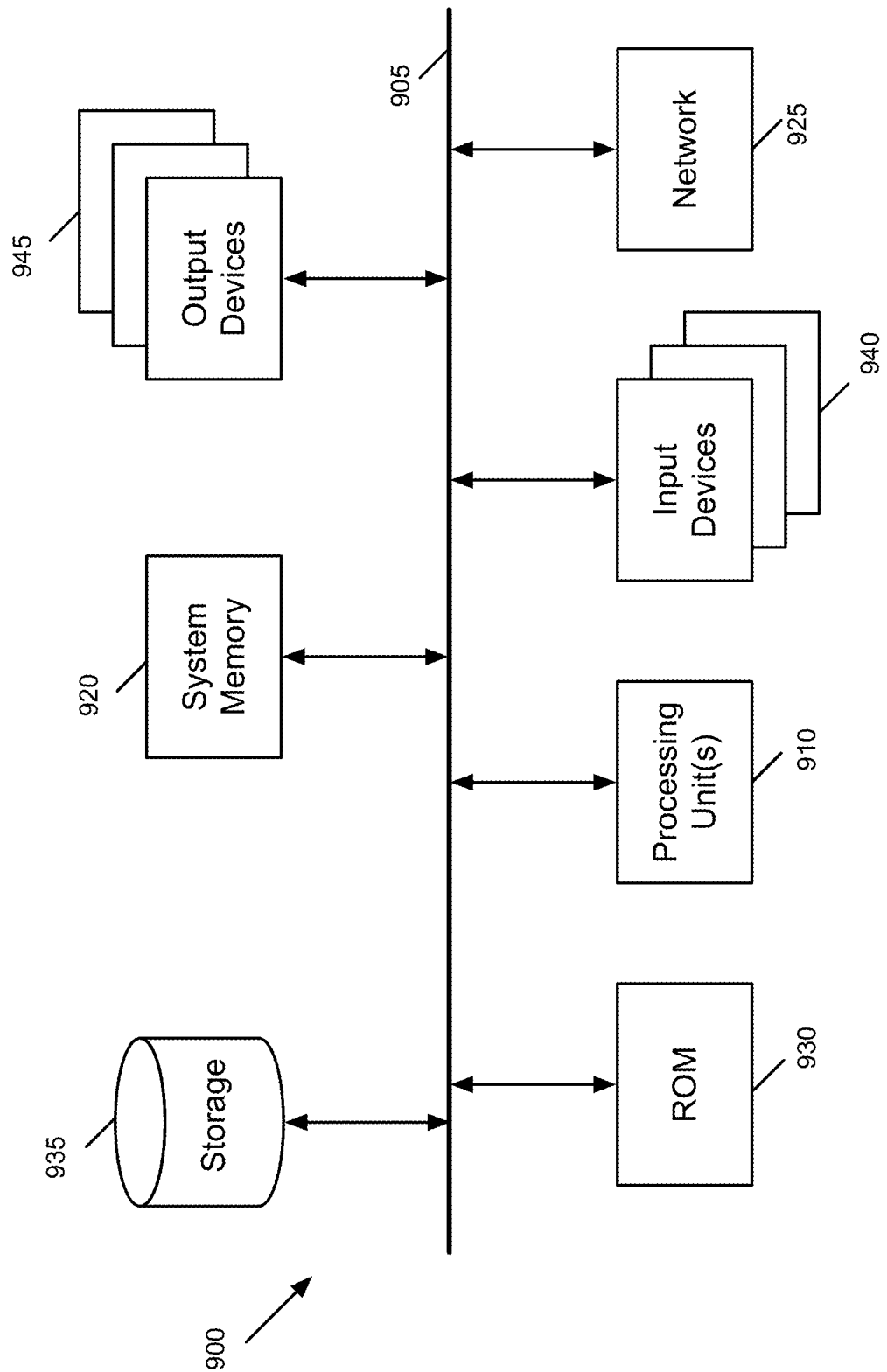

ACCESSING ENDPOINTS IN LOGICAL NETWORKS AND PUBLIC CLOUD SERVICE PROVIDERS NATIVE NETWORKS USING A SINGLE NETWORK INTERFACE AND A SINGLE ROUTING TABLE

BACKGROUND

A public cloud service provider provides cloud services such as storage and applications to general public. In a public cloud (or public datacenter), the service provider controls the hypervisor and may not provide robust or transparent security capabilities. It is, therefore, desirable to use a virtualization network provided by a third party (i.e., an entity other than the public cloud service provider) in a public cloud deployment. Such a cross-cloud virtualized network provides capabilities for enforcing network and security policies for workloads running on guest virtual machines (VMs) that are provisioned on a public cloud service provider's infrastructure and network. The third party created virtualized network can provide logical networking using overlays or simply integrate with native networking and provide services in addition to the services of the native network.

In an on-premise environment, customer applications running on guest VMs are managed by providing network and security services on the underlying hypervisor. However, in a public cloud environment, a third party network virtualization platform only has access to the guest VMs and not the underlying hypervisor on which the VMs are provisioned. In a public cloud, on the other hand, the service provider controls the underlying virtualization infrastructure on which guest VMs run. The virtualization infrastructure in the public cloud is not exposed to the end user.

The native networks that VMs use can be virtual networks provided by the cloud service provider. As a result, the logical networks that a third party virtualization network provisions sit on top of the cloud service provider's virtual networks and are not visible to the cloud service provider. When a VM is provisioned in the logical space of a third party created virtualization network, the VM's network interface becomes part of the logical address space that the third party network virtualization provider manages. The network interface is, therefore, not able to access the cloud service provider's native networks.

BRIEF SUMMARY

Some embodiments provide a method that allows VMs in public clouds to access service endpoints both in a cloud service provider's native network (referred to as the underlay network) address space as well as a logical address space (referred to as the overlay network) that is provisioned by a third party network virtualization provider. The method allows a VM to access the cloud service provider's native network address space and the third party logical address space using a single network interface and a single routing table.

The method installs a managed forwarding element (MFE) kernel driver (such as an Open vSwitch (OVS) kernel driver) on a VM. The MFE kernel driver is used as a software switch for virtual interfaces on the VM. Based on the mode of operation, i.e., overlay or underlay, one or two virtual adapters are created. One of the virtual adapters is used for accessing the overlay network (referred to as the overlay virtual adapter) and the other virtual adapter is used for accessing the underlay network (referred to as the underlay virtual adapter). In some embodiments, the overlay virtual adapter is a Virtual Interface (VIF) and the underlay virtual adapter is a virtual tunnel end point (VTEP). All packets from the network stack (e.g., the Transmission Control Protocol/Internet Protocol (TCP/IP)) stack are sent to either one of the virtual adapters, using a routing table. The MFE forwards the packets between the logical interfaces and the underlay network interface card (NIC) on receive and transmit paths.

The overlay virtual adapter is a part of a third party overlay networking space, while the underlay virtual adapter is a part of the underlay network space that is provided by the cloud service provider. Network packets that originate from the overlay virtual adapter are tunneled using the MFE and the underlay virtual adapter. Network packets that are directly sent out of the underlay network are sent without tunneling and are forwarded or routed in the underlay network space.

The VM's routing table is configured such that all traffic that is not in the same Layer-2 (L2) subnet as the underlay virtual adapter uses the overlay virtual adapter as the egress interface. Accordingly, the traffic destined to any network other than the public cloud service provider's network is sent out from the overlay virtual adapter.

The routing table is set up this way by using a lower interface metric for the overlay virtual adapter compared to the underlay virtual adapter. The route metric is a function of the interface metric and a lower interface metric translates to a lower route metric, which in turn is preferred over routes with a higher route metric. The default route through the overlay virtual adapter, therefore, has a higher priority than the default route via the underlay virtual adapter. As a result, all traffic that is not a part of the subnet of the underlay virtual adapter is sent out of the overlay virtual adapter.

Since the overlay virtual adapter belongs to the third party managed overlay network space, this virtual adapter cannot be used as is to reach cloud service provider endpoints that are in the cloud service provider managed underlay network space. To access the underlay service endpoints using the overlay virtual adapter, some embodiments learn the service endpoint IP addresses that the user wants to access directly through the VM. Logical routes are then configured in the logical routers provisioned by the third party network manager to direct traffic from the overlay virtual adapter to an underlay endpoint via a logical interface on the logical router that is connected to the underlay network space, with the next hop as the underlay next hop. The underlay logical interface is responsible for ARP resolution, etc., in the underlay network space.

Source network address translation (SNAT) is performed on the VM tenant application traffic that is sent out to the underlay network. The source IP address of the packet is translated to the underlay IP address of the VM (e.g., the IP address of the underlay network VTEP). Reverse SNAT (Un-SNAT) operation is performed on the return traffic received from the underlay endpoints. The destination address in the packet header is translated back to the original logical IP address of the overlay virtual adapter. The overlay virtual adapter then forwards the packet to the network stack, which in turn forwards the packet to the tenant application.

For applications that are hosted in the VM that underlay endpoints connect to, the incoming traffic on the underlay logical interface that is not overlay traffic is subjected to destination network address translation (DNAT). For the incoming traffic to the tenant application where the connection is originated from the underlay network, the destination address is translated to the logical IP address of the overlay virtual adapter. Reverse DNAT (Un-DNAT) is performed on the corresponding return traffic. The user (e.g., a system administrator) in some embodiments can configure a list of applications hosted in the VM for which the incoming traffic is subjected to the DNAT/Un-DNAT operations.

The third party logical network is used to enforce security on workload VMs based on user configuration. Security for logical and underlay networking is provided by the third party network manager server and MFE agents running within the guest VM. In addition, the cloud service provider's security service is used to provide underlay network security. For example, a cloud service provider provided security groups are used in addition to the distributed firewalls provided by the third party network manager server.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 9 conceptually illustrates an electronic system with which some embodiments of the invention are implemented.

DETAILED DESCRIPTION

In the public cloud, the service provider controls the underlying virtualization infrastructure on which guest VMs run and does not expose the virtualization infrastructure to the end user. Hence, in order for an entity other than the service provider to provide network and security services to end user's applications, such services have to be provided directly on guest VMs without the support of the underlying virtualization infrastructure.

This is in contrast with how virtual networking services are provided on-premise (e.g., on a private cloud network), where the services are provided by directly making use of the virtualization software (e.g., hypervisor) to deliver virtual networking features. Some embodiments provide a datapath to support virtual networking for guests in the public cloud. The guests, in some embodiments, utilize a guest operating system such as Microsoft Windows that does not provide different namespaces. Although several examples are provided below by referring to the Windows guest operating system, it should be understood that the invention is not limited to this exemplary operating system.

In some embodiments, the packet processing operations (e.g., classification operations, forwarding actions, etc.) are performed by a managed forwarding element (MFE) that operates as a software forwarding element. Open vSwitch (OVS) is an example of a flow entry-based software forwarding element. In some embodiments, MFEs operate on host machines that host virtual machines or other data compute nodes that serve as the sources and destinations for packets (e.g., in the virtualization software of such a host machine).

Figure 1:
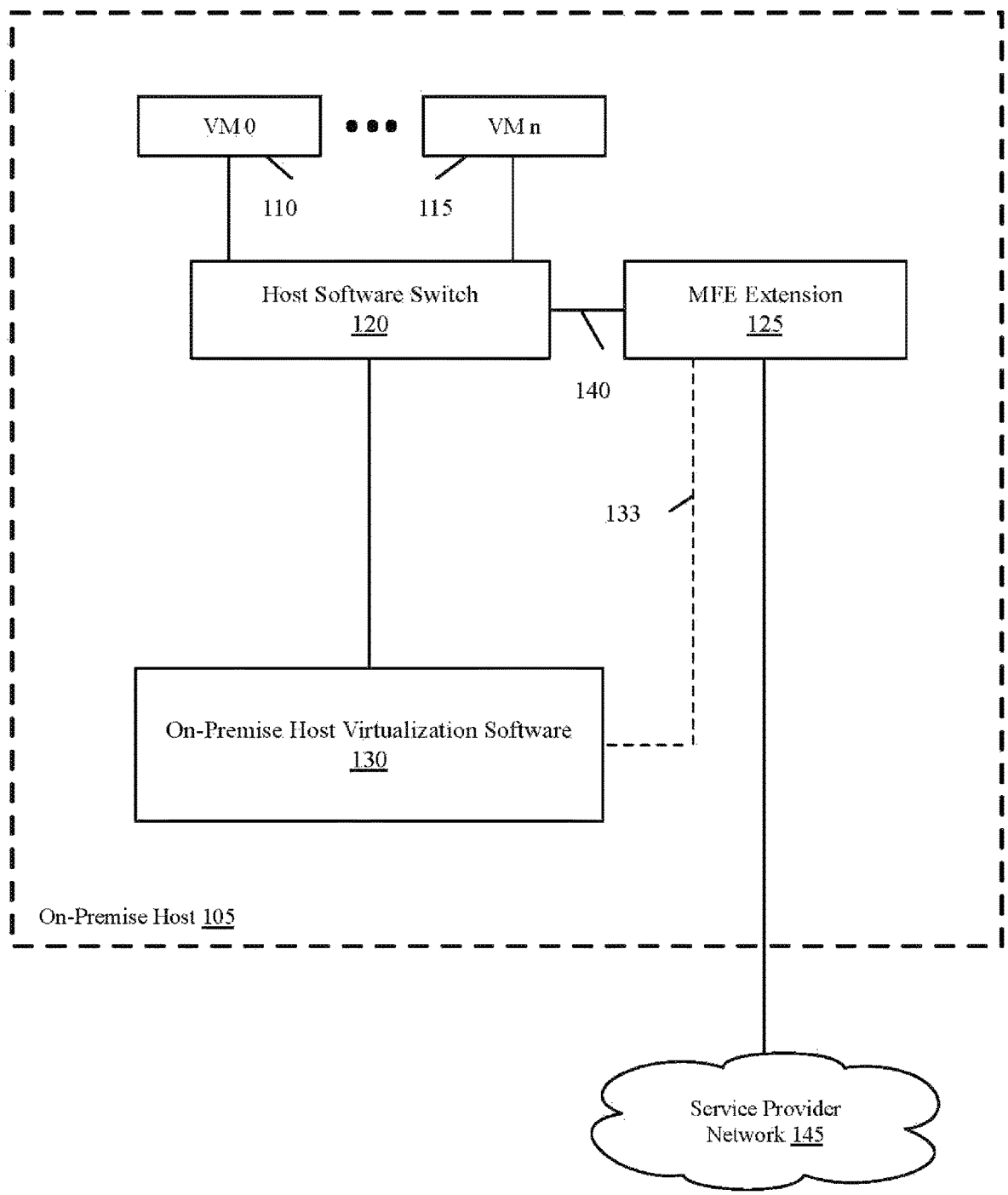
FIG. 1 illustrates an MFE implemented in an on premise, or private cloud, network.

The MFE can be used to implement the datapath for guest VMs hosted by on-premise service providers. FIG. 1 illustrates an MFE implemented in an on premise or (private cloud) network. In an on-premise network, the tenant has access to the virtualization software and the forwarding element provided by the service provider in the host.

As shown, the on-premise host 105 includes virtualization software 130 that creates guest VMs 110-115. A VM is a software implementation of a machine such as a computer. The on-premise host includes a software switch 120. The host software switch 120 is typically not a flow entry-based switch. In this example, the guest has provided an MFE extension module 125 that provides flow entry-based functionality (such as OVS functionality) for the tenant VMs 110-115.

Since the host 105 is an on-premise host, the tenant has access to the virtualization software 130 (as shown by 133) and the software switch 120 (as shown by 140) of the host. The virtualization software 130 provides hooks for the MFE extension 125 to handle packets that are coming from VMs 110-115, which are connected to the host software switch 120. The MFE extension module 125, which is a third party driver in this example, acts as an extension to the software switch 120 to provide flow entry-base packet switching for VMs 110-115 (e.g., for the VMs to communicate among themselves as to communicate with the service provider network 145).

I. Providing Datapath for Overlay and Underlay Services in a Public Cloud Network In a public cloud environment such as Amazon Web Services (AWS) or Microsoft Azure, the virtualization software is controlled by the cloud service provider and the third party drivers such as MFE extension 125 do not have access to the virtualization software or the host MFE. In order to provide MFE services (e.g., flow-based packet forwarding) to the VMs in a public cloud environment, some embodiments provide a new datapath that is able to work without having access to the virtualization software of the host. The new datapath in some embodiments is implemented as a kernel driver. To facilitate easier reuse of the core MFE functionality across public cloud and on-premise cloud environments, the datapath provides a switch implementation, referred herein as the base switch for MFE extension to interface with, and thus emulating the behavior of the MFE switch provided by the could service provider.

A. Providing Datapath for Overlay Services in Public Cloud

Some embodiments create two separate virtual adapters in a VM in order to provide overlay services for the VM in the public cloud. One virtual adapter is used by the VM to access a third party overlay network and another virtual adapter is used to access the public cloud service provider's network. Throughout this specification, the term underlay network refers to the service provider's network and the term underlay network interface card (NIC) refers to the virtual NIC exposed by the virtualization software to back the guest VM's network card.

Figure 2:
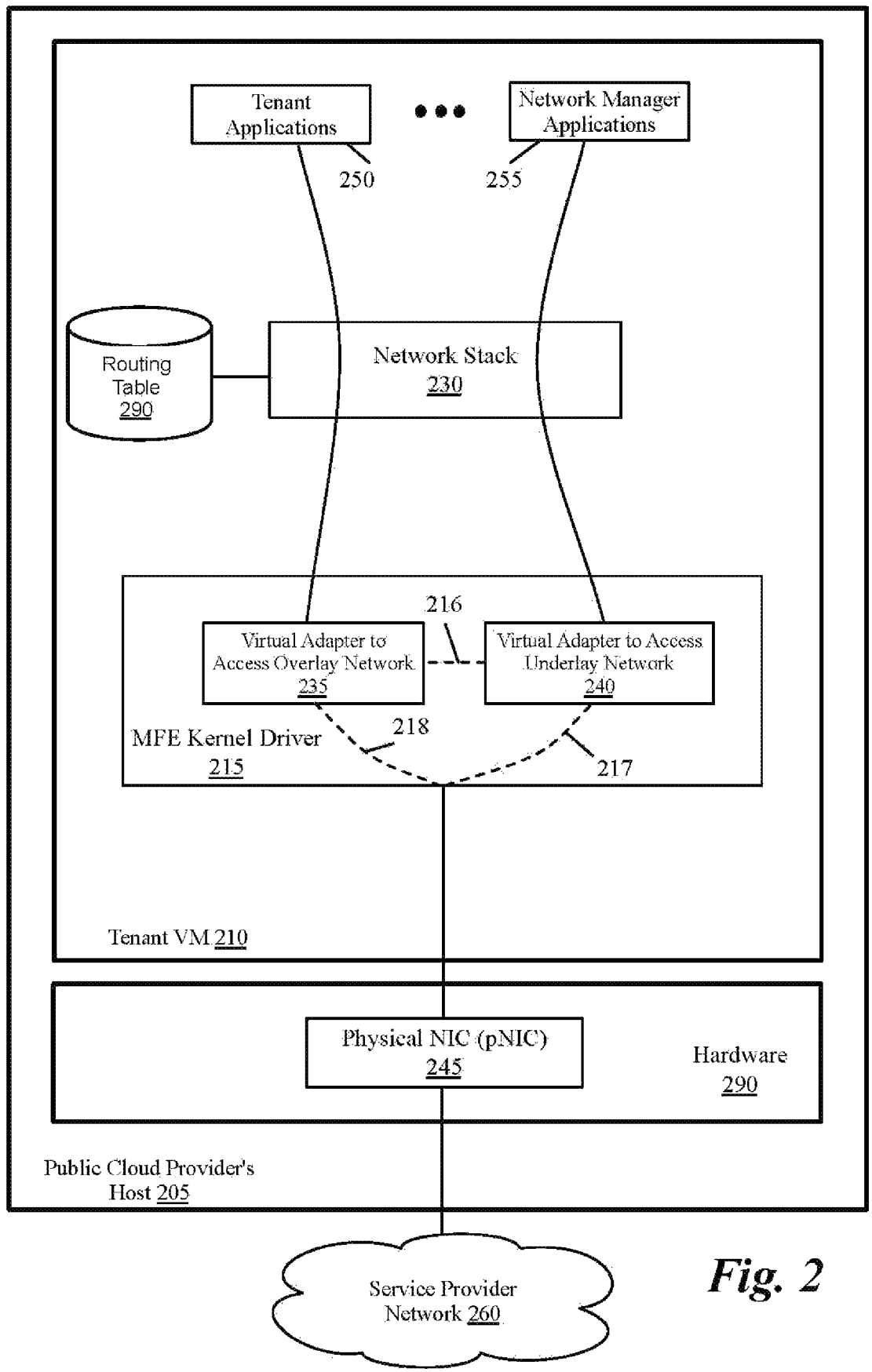
FIG. 2 conceptually illustrates a system for providing overlay services by a third party for a VM in a public cloud network in some embodiments.

FIG. 2 conceptually illustrates a system for providing overlay services by a third party for a VM in a public cloud network in some embodiments. The third party refers to an entity that does not have access to the virtualization software of the host machines in the public cloud network. The third party can be a vendor not affiliated with the public cloud service provider, a tenant, etc.

Although FIG. 2 is a software diagram, the host 205 is also shown to have hardware 290 in order to represent the physical network interface card (pNIC), which is a hardware entity. The figure shows a tenant VM 210 that is hosted on a host machine 205 that is provided by a public cloud service provider. Since tenants do not have access to the virtualization software of the host machines in the public cloud, the facilities to provide third party logical networks are implemented in each tenant VM 210, one of which is shown in FIG. 2.

A logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks.

The tenant VM 210 executes a set of tenant applications (e.g., web servers, database servers, application servers, etc.) 250. The tenant VM 210 also executes a set of third party applications 255. Examples of third party applications include different network manager agents or daemons that are used to create tenant logical networks (referred herein as overlay networks) and enforce network and security policies for the VM 210. The VM also includes a network stack 230 such as a TCP/IP stack.

The VM also includes an MFE kernel driver 215, a first virtual adapter 235 to access the third party overlay network, and a second virtual adapter 240 to access the underlay (or the public cloud's) network. The MFE kernel driver 215 and the virtual adapters 235-240 are in some embodiments configured by the network manager applications 255.

In some embodiments, the MFE kernel driver 215 is an OVS kernel driver. The first virtual adapter in some embodiments is a Virtual Interface (VIF) referred herein as the overlay virtual adapter. The second virtual adapter in some embodiments is a tunnel endpoint such as a Virtual EXtensible Local Area Network (VXLAN) tunnel endpoint (VTEP), referred herein as an underlay virtual adapter.

A VIF is an abstraction of a network interface that allows the applications to access the interface independent of the physical interface involved. An overlay network is a network virtualization technology that achieves multi-tenancy in a computing environment. The VTEPs are used to connect the end devices to VXLAN segments and to perform VXLAN encapsulation and decapsulation. The second virtual adapter in some embodiments is a tunnel end point for other types of overly networks such as Generic Network Virtualization Encapsulation (GENEVE) or Network Virtualization using Generic Routing Encapsulation (NVGRE). VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

All packets from the network stack 230 are sent to either the overlay virtual adapter 235 or the underlay virtual adapter 240, based on the values stored in the routing table 290. The MFE kernel driver 215 forwards the packets between the virtual adapters 235-240 and the pNIC 245 on the receive and transmit paths.

The VM's routing table 290 is configured such that all traffic that is not in the same L2 subnet as the underlay virtual adapter uses the overlay virtual adapter as the egress interface. In other words, any traffic destined to a network different than the underlay network adapter's subnet is sent out from the overlay network adapter. All devices in the same subnet have the same network prefix. The network prefix is expressed in Classless Inter-Domain Routing (CIDR) notation, which expresses the network prefix followed by a slash character ("/"), followed by the length of the prefix in bits. For instance, in Internet Protocol Version 4 (IPv4) the IP addresses include 32 bits and 172.16.0.1/20 indicates that 20 bits of the IP address are allocated for the subnet and the remaining 12 bits are used to identify individual destinations on the subnet.

The routing table 290 is configured by assigning a lower interface metric for the overlay virtual adapter compared to the underlay virtual adapter. An interface metric is a value that is assigned to a route for a particular interface to identify the cost associated with using the route through the particular interface. The metric for a route is a function of the interface metric, which means a lower interface metric translates to a lower route metrics, which in turn makes the route preferred over routes with a higher route metrics. The default route through the overlay virtual adapter has higher priority than the default route via the underlay virtual adapter. Therefore, by default, all traffic that is not part of the underlay virtual adapter's subnet is sent out of the overlay virtual adapter.

The guest operating system used by the tenant VM 210 in FIG. 2 is an operating system such as Windows that does not support multiple namespaces. For instance, the guest operation system could be Windows and the virtualization software 130 could be Microsoft Hyper-V. On the other hand, operating systems such as Linux allow the use of multiple namespaces. A namespace is an abstract container or environment that is created to hold a logical grouping of unique identifiers or symbols. An identifier such as an IP address that is defined in a namespace is associated only with that namespace and is not recognized in other namespaces.

Separate namespaces provide routing table separation. In an operating system such as Linux one can have two different namespaces and create the overlay virtual adapter in the namespace that the tenant application use and create the overlay virtual adapter in the other namespace that the physical NIC and the network manager applications use. The use of two separate namespaces greatly simplifies the routing problem because the applications just see one interface and by default pick the overlay virtual adapter in the routing table. In the embodiment of FIG. 2, the guest operating system does not provide multiple namespaces and therefore a single routing table is used.

The routing table 290 exposes application programming interfaces (APIs) and commands to give properties of the metric to the routes corresponding to the interfaces. During the initialization, the routing table is set such that once the overlay virtual adapter 235 and the underlay virtual adapter 240 are created, the overlay virtual adapter is given the higher priority. For instance, the metric for the underlay virtual adapter is assigned a number that is larger than any possible metric (e.g., 999). The overlay virtual adapter metric is assigned a number (e.g., 1, 10, 100, etc.) that is lower than the underlay virtual adapter metric.

Since the overlay virtual adapter 235 belongs to the third party managed overlay network space, the overlay virtual adapter cannot be used as is to reach cloud service provider endpoints, which are in the cloud service provider managed underlay network space 260. To access the underlay service endpoints using the overlay virtual adapter, some embodiments learn the service endpoint IP addresses that the tenant applications want to access directly through the VM. Logical routes are configured in Layer-3 (L3) logical routers provisioned by the third party network manager to direct traffic from the overlay virtual adapter to an underlay endpoint via a logical interface on the logical router that is connected to the underlay network space, with next hop as the underlay next hop. The underlay virtual adapter is responsible for address resolution protocol (ARP), etc. in the underlay network space.

For overlay services, the datapath has to support tunneling protocols, and therefore the underlay virtual adapter and/or the MFE 215 are required to perform the tunnel packet encapsulation for transmit packets, and tunnel packet decapsulation for received tunneled packets. All the underlay networking configurations on the underlay NIC 245 such as IP addresses and route configurations, are transferred over to the underlay virtual adapter 240. The networking configurations of the overlay virtual adapter 235 are controlled by a third party network manager agent (e.g., one of the network manager applications 255) or by the user of the VM.

In the example of FIG. 2, there are three separate types of communication paths. The first type of communication path is the path between the tenant application 250 in the tenant VM 210 and tenant applications in other tenant VMs on the same overlay network. This path uses IP addresses of the third party overlay network and the packets communicated between the VMs are encapsulated and decapsulated by the overlay network header. This path goes from tenant applications 250 through the network stack 230, to the overlay virtual adaptor 235, to the underlay virtual adapter 240 (as shown by 216), and to the pNIC 245 (as shown by 217).

The second type of communication path is the path between the tenant applications 250 and entities (or nodes) in the underlay network 260. The tenant applications 250 use IP addresses defined by the third party overlay network and the underlay network entities use IP addresses defined by the public cloud provider's network. Packets sent from the tenant applications 250 to the entities in the service provider network 260 require source network address translation (SNAT). The reply packets are subject to Un-SNAT operation. Packets initiated from the entities in the service provider network 260 and addressed to the tenant applications 250 require destination network address translation (DNAT). The reply packets are subject to Un-DNAT operation. The packets communicated in this path do not require overlay network encapsulation and decapsulation. This path goes from tenant applications 250 through the network stack 230, to the overlay virtual adaptor 235, and to the pNIC 245 (as shown by 218).

The third type of communication path is the path between the network manager applications 255 and the entities in the service provider network 260. The packets exchanged in this path use the IP addresses of the service provider network. There is no need for address translation or encapsulation/decapsulation of the packets in this path. This path goes from network manager applications 255 through the network stack 230, to the underlay virtual adapter 240, and to the pNIC 245 (as shown by 217). Further details of these paths are described below by reference to FIG. 3.

Figure 3:
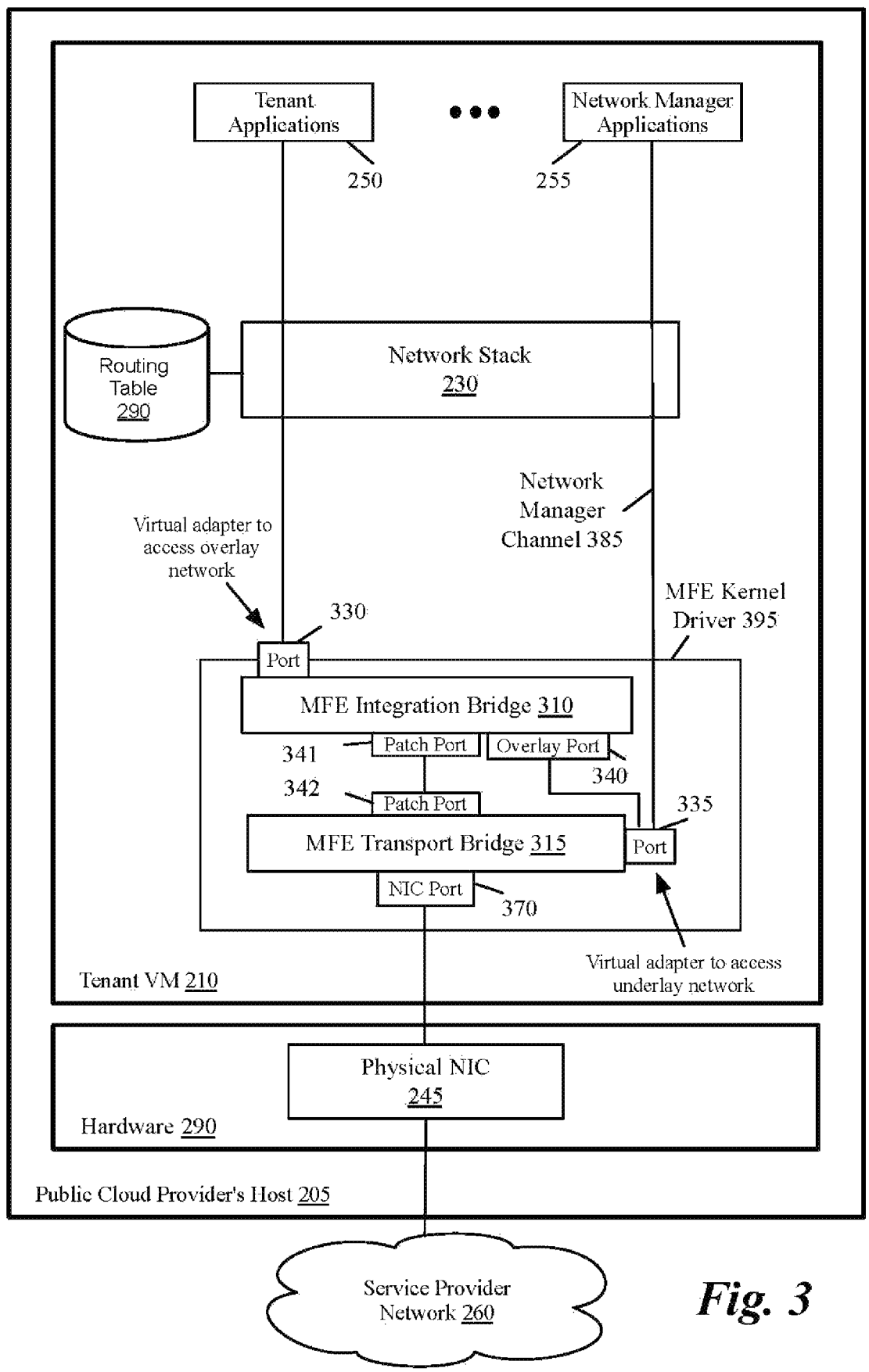
FIG. 3 conceptually illustrates an MFE kernel driver that includes a transport bridge and an integration bridge to support overlay services in some embodiments.

In order to properly forward packets from the virtual adapters, the MFE driver in some embodiments includes two bridges. FIG. 3 conceptually illustrates an MFE kernel driver 395 that includes a transport bridge 315 and an integration bridge 310 to support overlay services in some embodiments. The overlay virtual adapter (e.g., the overlay virtual adapter 235 in FIG. 2) is configured as a port 330 on the MFE integration bridge 310. The underlay virtual adapter (e.g., the underlay virtual adapter 240 in FIG. 2) is configured as a port 335 on the MFE transport bridge 315. Network manager applications 225 access (as shown by the network manager channel 385) the underlay network 260 through the underlay virtual adapter 335 without going through the overlay network adapter 330.

Ports 341-342 are created on each of the two bridges to create a transport for traffic between the overlay network adapter 330 (i.e., port 330 on the integration bridge 310) to the underlay NIC port 370 residing on the transport bridge 315. Ports 341-342 in some embodiments are patch ports that are used to connect two bridges to each other.

Based on the tunneling protocols chosen by the user, one or more tunnel ports 340 (referred to herein as overlay ports) are created on the integration bridge that are responsible for encapsulation and decapsulation of tunnel headers on packets from and to port 330 respectively. The third party network manager local control plane (LCP) agent and central control plane (CCP) can program datapath flows through user space daemons (e.g., the network manager applications 255). Distributed firewall (DFW) rules are programmed by network manager applications 255 to enforce security policies for tenant applications 250 packet traffic.

The three types of communication path described above by reference to FIG. 2 are present in FIG. 3. The first communication path is the path between the tenant applications 250 in VM 210 and other tenant applications on the same overlay network. This path is from (or to) a tenant application 250 and goes through the network stack 230, the overlay virtual adaptor (i.e., port 330, which could be a VIF), the MFE integration bridge 310, the overlay port 340, the underlay virtual adaptor (i.e., port 335, which could be a VTEP), the MFE transport bridge 315, NIC port 370, and physical NIC 245. The packet is then communicated to (or from) another tenant application either on the same host 205 or on another host. The packet may or may not go through the service provider network 260 depending on the implementation and whether the source and destination tenant applications are on the same or different hosts.

The second communication path is between the tenant applications 250 in VM 210 and entities in the underlay network 260. This path is from (or to) a tenant application 250 and goes through the network stack 230, port 330, the MFE integration bridge 310, patch ports 341 and 342, MFE transport bridge 315, NIC port 370, and Physical NIC 245 to (or from) an entity in the service provider network 260.

The third communication path is between the network manager applications 255 and the entities in the service provider network 260. This path is from (or to) a network manager application 255 and goes through the network stack 230, port 335, the MFE transport bridge 315, NIC port 370, and physical NIC 245 to (or from) an entity in the service provider network 260.

B. Providing Datapath for Underlay Services in Public Cloud

Some embodiments provide a new datapath to apply network security and management policies to user's applications that access underlay services. These policies are applied onto the datapath. A single virtual adapter is created that binds to the corresponding underlay NIC. This virtual adapter in some embodiments emulates the behavior of a VIF. All networking configurations on the underlay NIC, such as IP addresses and route configurations, are transferred over to the virtual adapter to provide access to underlay services.

Figure 4:
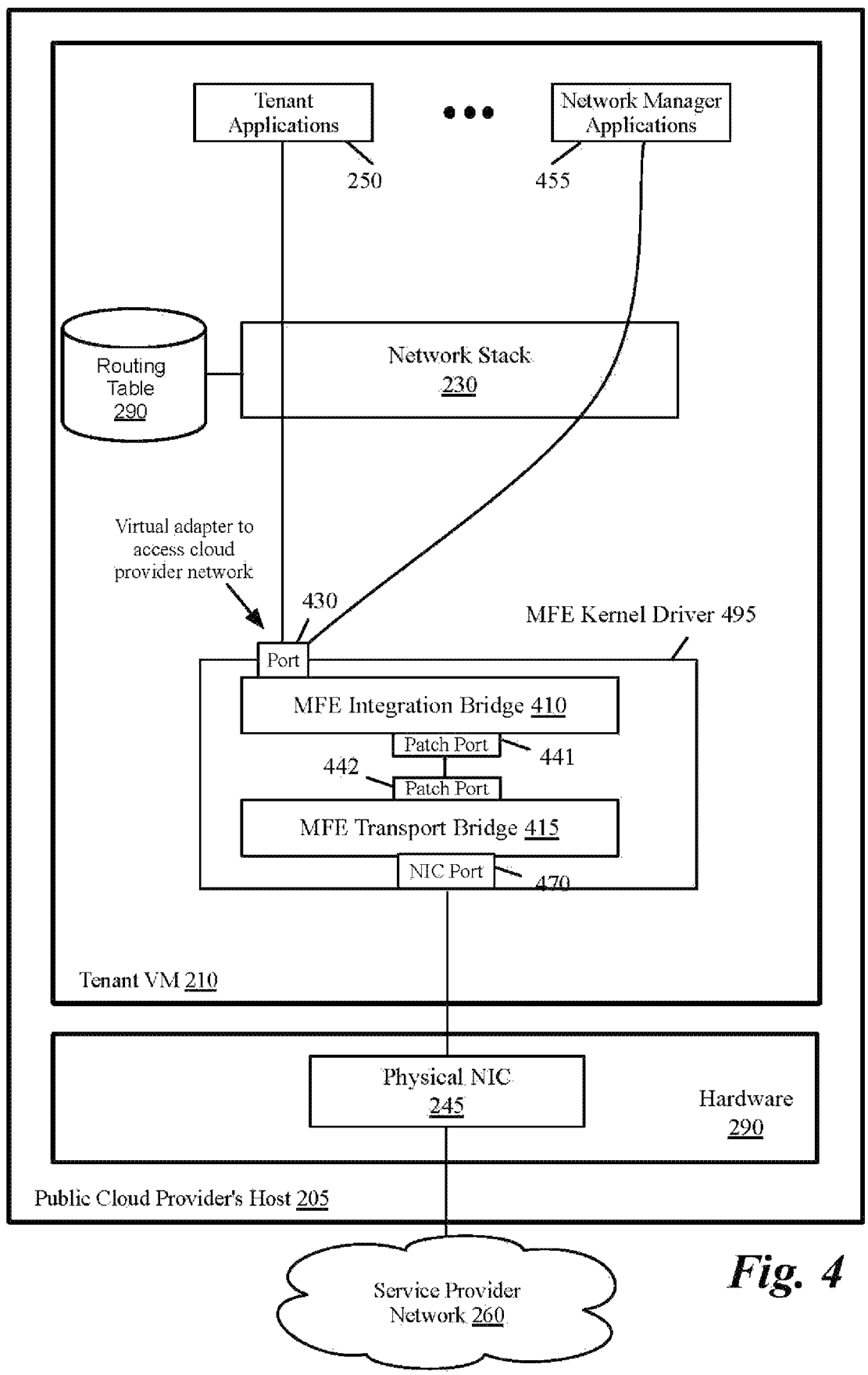
FIG. 4 conceptually illustrates an MFE kernel driver that includes a transport bridge and an integration bridge to support underlay services in some embodiments.

FIG. 4 conceptually illustrates an MFE kernel driver 495 that includes a transport bridge 415 and an integration bridge 410 to support underlay services in some embodiments. MFE user space daemons (e.g., network manager applications 255) are used to configure the MFE bridges. To use the underlay NIC for underlay services, two MFE bridges are created, a transport bridge 415 and an integration bridge 410. The underlay NIC port 470 is part of the transport bridge 415, and port 430 (e.g., a VIF) is part of the integration bridge 410.

Patch ports 441-442 are created on each of the two bridges to create a transport for traffic between port 430 on the integration bridge 410 to the underlay NIC port 470 residing on the transport bridge 415. The third party network manger LCP agent and CCP are responsible for programming the flows on the datapath that determine the packet forwarding behavior for the traffic egressing out of port 430. DFW rules are also programmed by network manager application 455 to enforce the desired security policies.

In the embodiments of FIG. 4, tenant applications 250 are not on a third party overlay network. Instead, the services of a third party network manager (e.g., network manager applications 455) are used to provide security such as a DFW for the tenant applications 250. The tenant applications 250 and network manager applications 455 use the IP address space of the service provider network 260. There is therefore no need to perform SNAT or DNAT for exchanging packets between the tenant applications 250 and the entities in the service provider network. There is also no need to perform encapsulation/decapsulation operations. As shown, the tenant application 250 and the network manager applications 455 both use the same virtual adapter, is port 430 on the MFE integration bridge 410.

II. Reusing of the MFE Driver in Public and On-Premise Cloud Environments

In some embodiments the kernel driver is an OVS driver. The OVS driver, referred herein as OVSIM, is a network driver interface specification (NDIS) intermediate kernel driver that reuses most of the MFE extension 125 functionality shown in FIG. 1. In these embodiments, OVSIM provides NDIS protocol and NDIS miniport driver functionalities. NDIS is an API for the NICs. It was jointly developed by Microsoft and 3Com Corporation and is mostly used in Microsoft Windows. OVSIM is an NDIS Intermediate driver that is used to create virtual miniport adapters that bind to the underlay NIC of the Windows guest VM.

Figure 5:
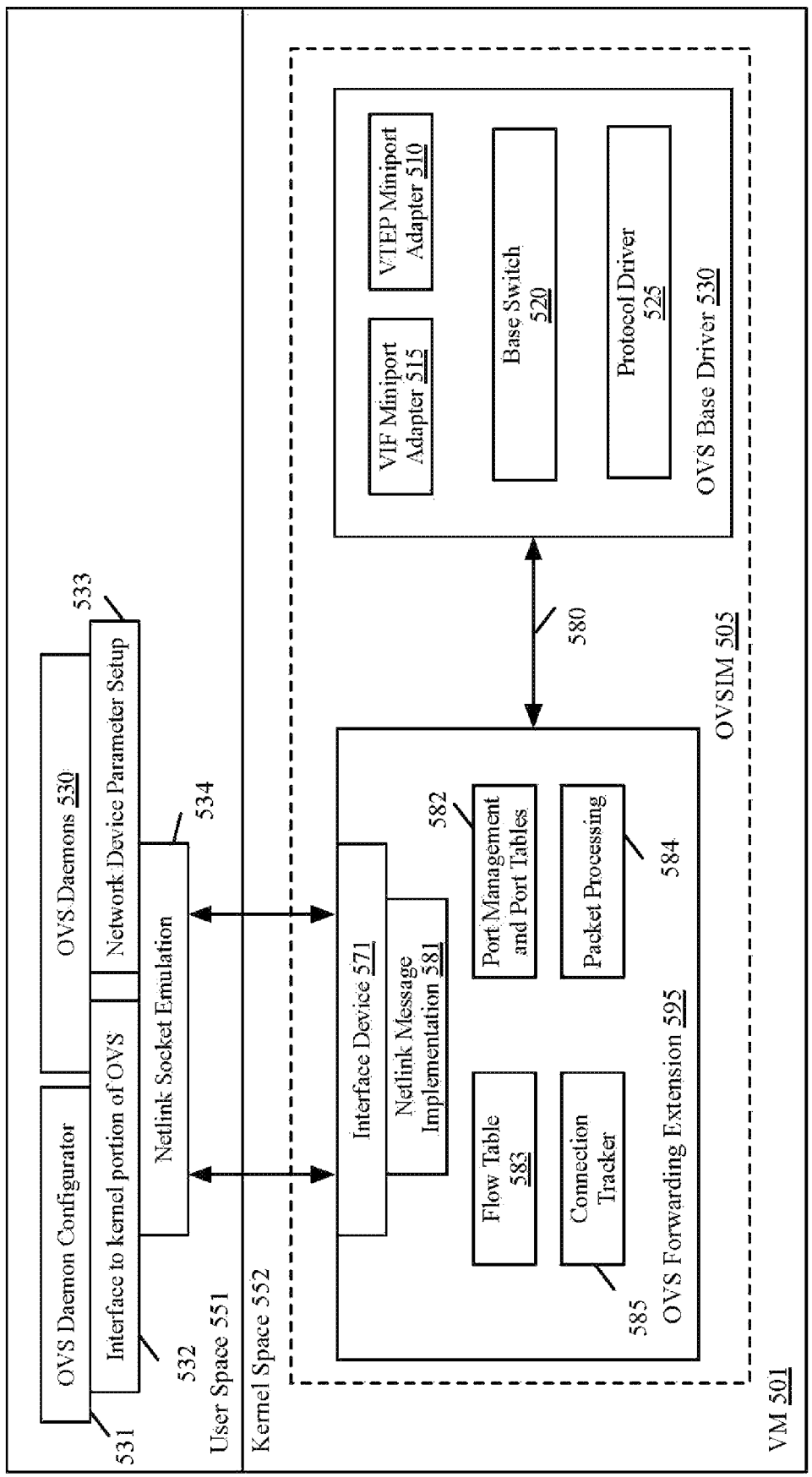
FIG. 5 conceptually illustrates the architecture of an OVS driver for a VM that executes a Windows guest operating system in some embodiments.

FIG. 5 conceptually illustrates the architecture of an OVSIM driver 505 for a VM 501 that executes a Windows guest operating system in some embodiments. The OVSIM driver 505 includes the OVS base driver 530 and the OVS forwarding extension 595. The OVS base driver exposes a protocol driver 525 and miniport driver interfaces 510-515. The base switch 520 is a Layer-2 forwarding component. The OVS extension 595 exposes the core OVS functionality of packet processing and actions that is reused from the on-premise (private) cloud (shown as MFE extension 125 in FIG. 1) in the public cloud.

As shown, the OVS base driver 530 includes two virtual adapters. One virtual adapter 515 is an overlay virtual adapter that is created in the VM to emulate the behavior of a VIF. The other virtual adapter 510 is an underlay virtual adapter that is created in the VM to emulate a VTEP. The base switch 520 provides Layer-2 forwarding functionality, and an interface 580 between the OVS base driver 530 and the OVS extension 595.

OVS daemons 530 in the VM user space 551 are used to create user space configurations such as OVS bridges to which the virtual miniports and underlay network interfaces are added. Other functionalities of the user space components include OVS daemon configurator 531, interface to kernel portions of the OVS 532, network device parameter setup 533, and Netlink socket emulation 534. Netlink is an interface used for inter-process communication between processes running in the user space and kernel space.

With OVSIM 505 installed, all packets that are transmitted through the virtual miniports 510-515 can be managed to provide networking and security policies. These policies are configured in the OVS datapath and user space 551 using OVS flows.

A. OVS Base Driver Implementation

The OVS base driver 530 is a combination of two drivers, a protocol driver 525 as the lower edge and a miniport driver as its upper edge. The miniport driver exposes one or more virtual miniport adapters 510-515 using the miniport edge to interface with higher layer protocol drivers such as TCP/IP (e.g., the network stack 230 in FIGS. 2 and 3). The driver's protocol edge is used to interface with the VTEP miniport adapter 510, which is bound to the underlay NIC. The bindings between the protocol and miniport edge of the base driver itself is implementation specific, and not controlled by NDIS.

Once the driver is loaded into the operating system, all higher level protocols, such as TCP/IP, that were earlier bound to the underlay NIC, are bounded to the virtual miniport adapters that the driver creates. All networking configurations previously associated with the underlay NIC are associated with the virtual miniport adapters.

The OVSIM configurations are controlled by a user space component called notify object, which is exposed to the Windows operating system as a system data link library (DLL). Once the driver load is initiated by the user, the notify object DLL is responsible for creating the protocol and miniport driver configurations required for the OVS base driver to load in the kernel 552. The notify object component is responsible for creating the virtual miniport adapter configurations required by the OVSIM kernel driver, sending notifications to the driver regarding changes in network configurations, and in unbinding higher layer protocol drivers from the underlay NIC's miniport driver and binding them to the newly created virtual miniport drivers. Notify object uses the COM and INetcfg interfaces provided by the Windows operating system to initiate network configuration changes such as addition or removal of virtual miniports. Additionally, the notify object component provides a user interface to add or remove virtual miniport adapters as desired.

Once the driver has loaded, based on the configurations created by the notify object component, the protocol edge of the OVS base driver is responsible for creating and bootstrapping the virtual miniport adapters. Based on the type of operational mode for the underlay NIC, overlay or underlay, the virtual miniports are initialized appropriately in the kernel.

B. Base Switch Implementation

The base switch 520 is a component that provides Layer-2 forwarding functionality. The base switch maintains a list of ports corresponding to every adapter interface that the OVS base driver exposes. The driver exposes an interface for the underlay NIC and the virtual miniports that are bound to the underlay NIC. For every adapter interface, underlay or overlay, a corresponding port is created on the base switch 520. The primary role of the base switch component is to look up the destination port in the packet that it receives and output the packet to destination port if the port exists.

If the packet has a destination port that is not a part of the base switch port list, then the packet is dropped and a notification is sent back to the caller. Additionally, the base switch also serves as an interface between the OVS base driver 530 and the OVS extension 595. The base switch 520 receives packets on the transmit and receive paths from OVS base driver and sends the packets over to the OVS extension 595 to determine the actions to be taken on the packet and based on the actions, and outputs the packet back to the OVS base driver 530.

On the transmit path, the miniport adapter inputs the packet into the base switch 520, which will send the packet to the OVS extension 595 for packet processing. Based on the actions applied on the packet, the OVS extension 595 returns the packet back to base switch 520, which either forwards the packet to the destination port corresponding to the underlay NIC, or drops the packet. Similarly, on the receive path, the protocol edge inputs the packet into the base switch 520, and appropriate actions are taken by the base switch 520 based on decisions made on the packet by the OVS extension 595. The packet is either forwarded to the corresponding virtual miniport, or is dropped.

The base switch 520 emulates the behavior of a Microsoft Hyper-V switch, and provides an interface to the OVS extension 595 similar to the Hyper-V switch. This model makes it easy to reuse a core of the OVS extension functionality from the OVS for the on-premise cloud (e.g., the MFE extension 125 shown in FIG. 1). The addition or removal of the underlay NIC or virtual miniport adapters in OVS base driver is reflected in the base switch port list.

C. OVS Extension Implementation

The OVS extension 595 component provides the core OVS datapath functionality for OVS on Windows. The OVS extension 595 in some embodiments is also used as an NDIS forwarding extension kernel driver to the Hyper-V extensible virtual switch in an on-premise cloud (e.g., the MFE extension 125 described above by reference to FIG. 1). The OVS forwarding extension 595 provides functionalities such as switch and datapath management, tunneling, event notifications, etc.

The functionalities provided by the OVS extension 595 component include Netlink message implementation 581 (that includes Netlink parsers and Netlink sockets), interfacing through the interface driver 571 with OVS user space 551 components, port management and port tables 582, flow table 583, packet processing 584, and connection tracking 585.

Most of the core OVS extension functionality are reused for the datapaths created for the public and on-premises clouds. The OVS extension in the on-premises cloud is used as a driver while in the public cloud the OVS extension is used as a component that provides core OVS functionality to the OVSIM and the base switch modules.

The base switch provides functionality similar to the Hyper-V virtual switch. The OVS extension directly interfaces with the base switch directly, in contrast to using NDIS to interface with the Hyper-V virtual switch in the case of the on-premise cloud. All packets from the virtual miniports or the underlay NIC are input into the base switch, followed by the OVS extension. Based on the actions determined by the OVS extension, the packets are output to the corresponding base switch port.

Figure 6A:
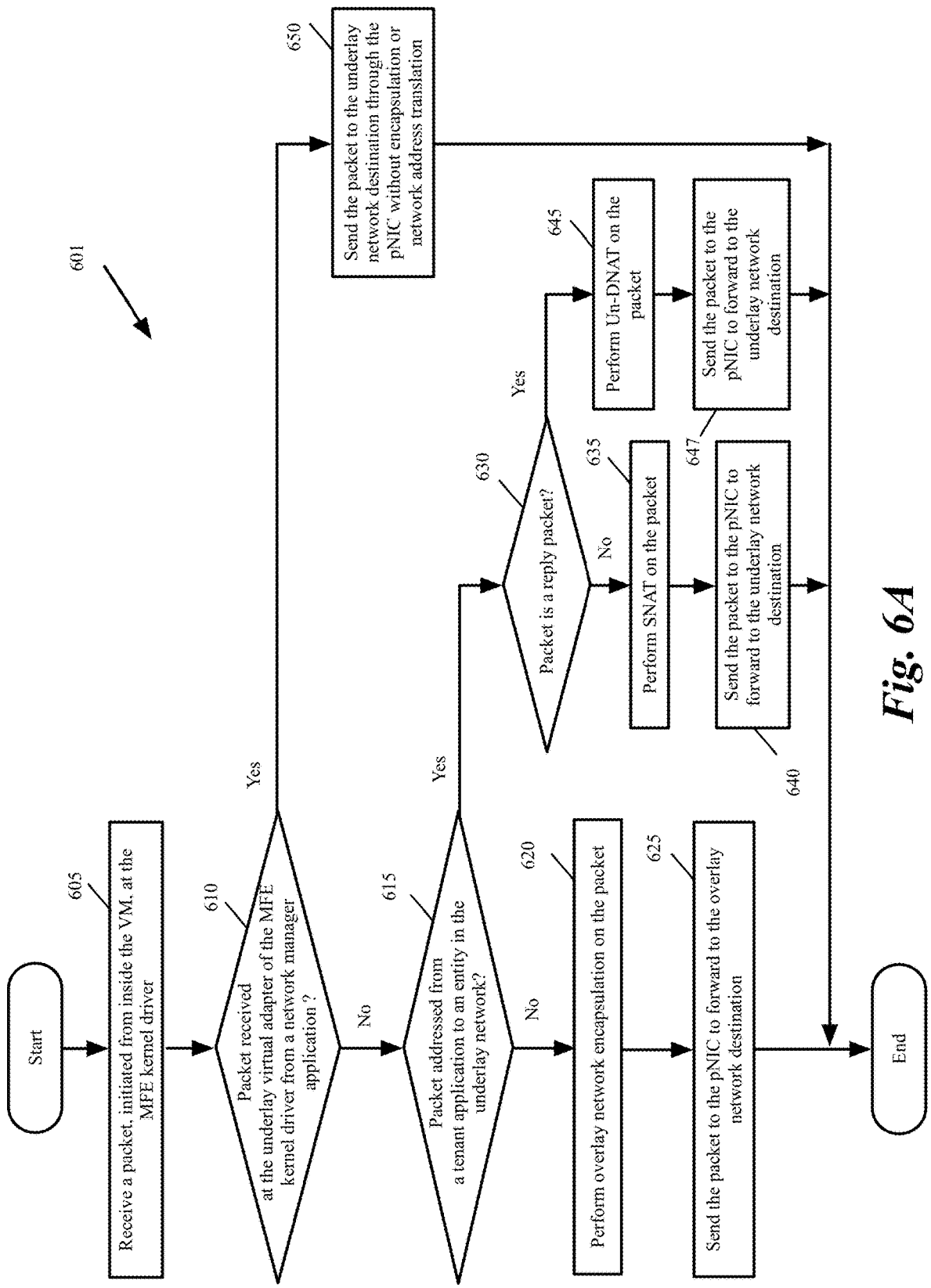
FIG. 6A conceptually illustrates a high-level process of some embodiments for forwarding a packet initiated from a VM that is hosted on a public cloud provider host machine to other entities on the overlay or underlay networks.

III. Exchanging Packets Between a Third Party Logical Network and a Public Cloud Network As described above by reference to FIGS. 2 and 3, some embodiments provide three different communication paths in a VM that is hosted on a public cloud provider host machine. FIG. 6A conceptually illustrates a high-level process 601 of some embodiments for forwarding a packet initiated from a VM that is hosted on a public cloud provider host machine to other entities on the overlay or underlay networks. The process in some embodiments is performed by an MFE kernel driver such as the MFE kernel drivers 215 and 395 in FIGS. 2 and 3, respectively.

As shown, the process receives (at 605) a packet, which is initiated from outside the VM, at the MFE kernel driver. For instance, the process receives a packet from the network stack 230 at the MFE kernel driver 215 in FIG. 2 or at the MFE kernel driver 395 in FIG. 3. The process then determines (at 610) whether the packet is received at the underlay virtual adapter of the MFE kernel driver from a network manager application in the VM. For instance, the process determines whether a packet is received from a network manager application 255 through the network stack 230 at the underlay virtual adapter 240 or 333 in FIG. 2 or 3, respectively. If yes, the process proceeds to 650, which is described below.

Otherwise, the packet is received at the overlay network adapter 235 in FIG. 2 (or 330 in FIG. 3). The process determines (at 615) whether the packet is addressed from a tenant application in the VM to an entity in the underlay network. For instance, the process determines whether the packet is received from a tenant application #0250 and addressed to a server or node in the service provider network #0260 IP address space. If yes, the process proceeds to 630, which is described below. Otherwise, the packet is a packet that is sent from a tenant application 250 in the VM 210 to a tenant application on the overlay network in another VM. For instance, the packet is a packet that is received at the overlay virtual adapter 235 in FIG. 2 (or 330 in FIG. 3) from a tenant application 250. The process, therefore, performs (at 620) overlay network encapsulation on the packet. For instance, the packet that was received at port 330 in FIG. 3 is sent to the MFE integration bridge 310, which performs encapsulation on the packet.

The process then sends (at 625) the packet to the pNIC to forward the packet to the overlay network destination. For instance, referring to FIG. 2, the process forwards the packet from the overlay virtual adapter 235 to the underlay virtual adapter 240 (as shown by 216), to the pNIC 245 (as shown by 217) to send the packet to the overlay network destination. Also, referring to FIG. 3, the process forwards the packet from the MFE integration bridge 310, the overlay port 340, port 335, MFE transport bridge 315, and NIC port 370 to the pNIC 245 to send the packet to the overlay network destination. The process then ends.

When the process determines that the packet is received from a tenant application on the overlay network and the packet is addressed to an entity in the underlay network, the process determines (at 630) whether the packet is a reply packet that is sent from the tenant application to the underlay network entity. For instance, if the tenant application is a web server, the tenant application may send a packet as a reply to a request received from an entity in the public cloud (i.e., the underlay network) IP address space.

If yes, the process proceeds to 645, which is described below. Otherwise, the process performs (at 635) SNAT on the packet. For instance, SNAT is performed on the packet by the MFE transport bridge 315 in FIG. 3. Details of performing SNAT on the packets are described below by reference to FIG. 7. The process then sends (at 640) the packet to the pNIC to forward to the underlay network. For instance, referring to FIG. 2, the process forwards the packet to the pNIC 245 to send to the underlay network destination. Also, referring to FIG. 3, the process forwards the packet from the MFE transport bridge 315 (that performed the SNAT operation) through the NIC port 370 to the 245 to send to the addressed entity in the service provider network 260. The process then ends.

When the process determines that the packet is a reply packet, the process preforms (at 645) un-DNAT operation on the packet. Details of the un-DNAT operation are described further below. The process then sends (at 647) the packet to the pNIC to forward to the underlay network. The process then ends.

When the packet is received at the underlay virtual adapter from a network manager application, the process sends (at 645) the packet to the pNIC to forward to the underlay network destination. For instance, referring to FIG. 2, the process forwards the packet from the underlay virtual adapter 240 to the pNIC 245 (as shown by 217) to forward to the underlay network destination. Also, referring to FIG. 3, the process forwards the packet from port 335, through the MFE transport bridge 315 and NIC port 370 to the pNIC 245 to forward to the underlay network destination. No SNAT/DNAT or encapsulation/decapsulation is performed on the packet as both source and destination entities use the IP addresses of the underlay network address space. The process then ends.

Figure 6B:
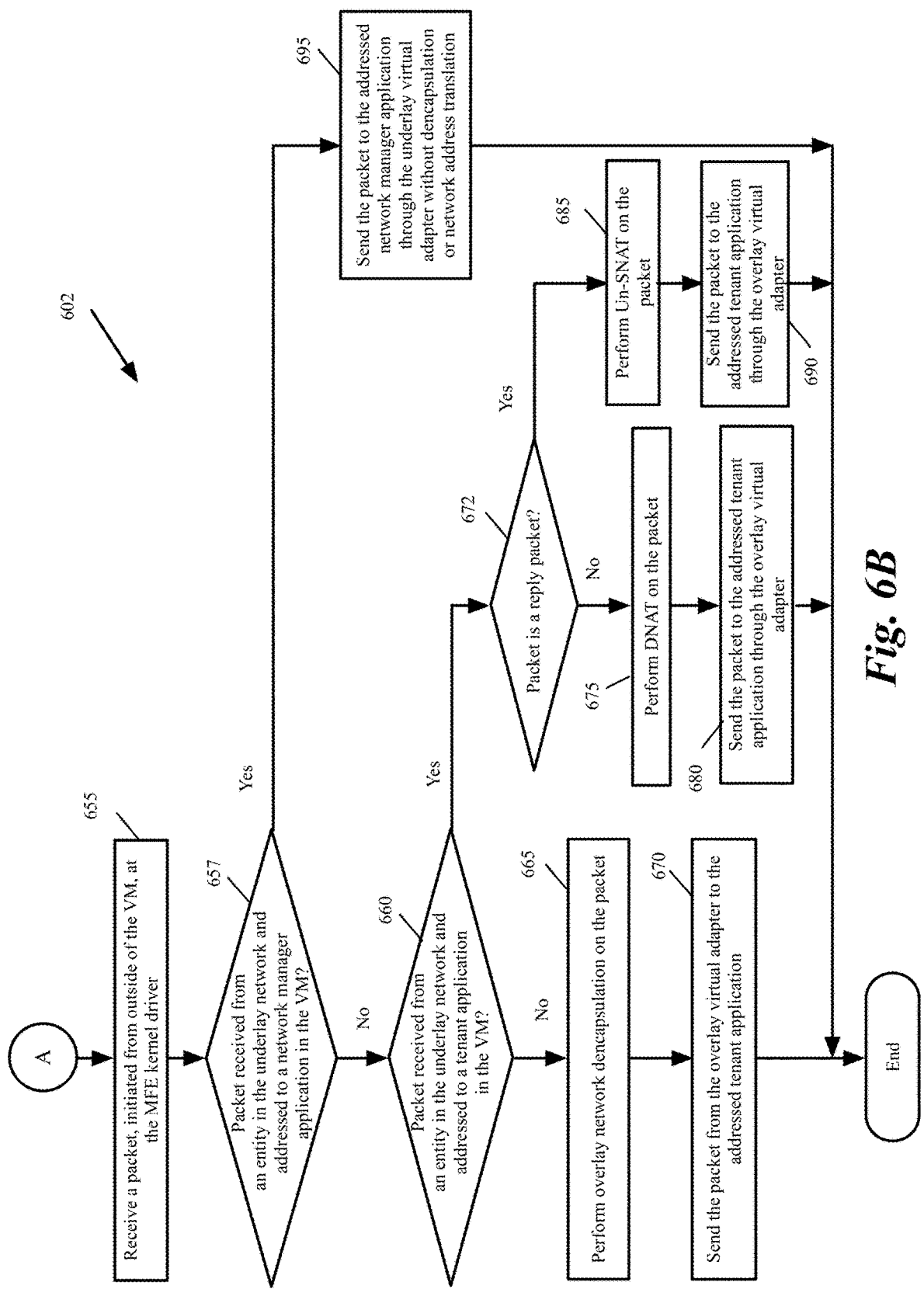
FIG. 6B conceptually illustrates a high-level process of some embodiments for forwarding a packet initiated from outside of a VM that is hosted on a public cloud provider host machine to an entity in the VM.

FIG. 6B conceptually illustrates a high-level process 602 of some embodiments for forwarding a packet initiated from outside of a VM that is hosted on a public cloud provider host machine to an entity in the VM. The process in some embodiments is performed by an MFE kernel driver such as the MFE kernel drivers 215 and 395 in FIGS. 2 and 3, respectively.

As shown, the process receives (at 655) a packet, which is initiated from outside of the VM, at the MFE kernel driver. The process then determines (at 657) whether the packet is received from an entity in the underlay network and addressed to a network manager application in the VM. If yes, the process proceeds to 695, which is described below. Otherwise, the process determines (at 660) whether the packet is received from an entity in the underlay network and addressed to a tenant application in the VM.

If yes, the process proceeds to 672, which is described below. Otherwise, the packet is received from an entity on the overlay network and addressed to a tenant application in the VM. The process, therefore, performs (at 665) overlay network decapsulation on the packet. For instance, the packet that was received from the pNIC 245 at the NIC port 370 is sent through the MFE transport bridge 315, port 335, and overlay port 340 to the integration bridge, which performs overlay network decapsulation on the packet.

The process sends (at 670) the packet to the addressed tenant application through the overlay virtual adapter. For instance, referring to FIG. 3, the process forwards the packet from the MFE integration bridge 310 (which performs decapsulation) through port 330 (which is the overlay virtual adapter) and the network stack 230 to the destination tenant application 250. The process then ends.

When the packet is received from an entity in the underlay network and addressed to a tenant application in the VM, the process determines (at 672) whether the packet is a reply packet that an underlay network entity has sent in response to a request from a tenant application. If yes, the process proceeds to 685, which is described below. Otherwise, the process performs (at 675) DNAT on the packet. For instance, DNAT is performed on the packet by the MFE transport bridge 315 in FIG. 3. Details of performing DNAT on the packets are described below by reference to FIG. 8.

The process then sends (at 680) the packet to the addressed tenant application through the overlay virtual adapter. For instance, referring to FIG. 2, the process forwards the packet from the overlay virtual adapter 235 and the network stack 230 to the destination tenant application 250. Also, referring to FIG. 3, the process forwards the packet from the MFE integration bridge 310, port 330, and the network stack 230 to the destination tenant application 250. The process then ends.

When the packet received from an entity in the underlay network and the packet is a reply packet sent to a tenant application, the process performs (at 685) un-SNAT operation on the packet. Details of un-SNAT operation are described below by reference to FIG. 8. The process then sends (at 690) the packet to the addressed tenant application through the overlay virtual adapter. For instance, referring to FIG. 2, the process forwards the packet from the overlay virtual adapter 235 and the network stack 230 to the destination tenant application 250. Also, referring to FIG. 3, the process forwards the packet from the MFE integration bridge 310, port 330, and the network stack 230 to the destination tenant application 250. The process then ends.

When the packet is received from an entity in the underlay network and addressed to a network manager application in the VM, the process sends (at 695) the packet to the addressed network manager application through the underlay virtual network adapter without decapsulation or network address translation. For instance, referring to FIG. 2, the process forwards the packet received from the pNIC 245 (as shown by 217) through the underlay virtual adapter 240 and the network stack 230 to the destination network manager application 255. Also, referring to FIG. 3, the process forwards the packet received from the pNIC 245 through NIC port 370 to the MFE transport bridge 315, port 335, an the network stack 230 to the destination network manager application 255. The process then ends.

The public cloud network and the third party overlay network have different IP addresses. The addresses in the overlay network are, therefore, not recognizable by the public cloud's underlay network and vice versa. For the packets that are exchanged between tenant applications 250 in FIGS. 2 and 3 on the overlay network and the entities in the underlay network 260, some embodiments perform network address translation (NAT).

Some embodiments perform source network address translation (SNAT) on the packets that are sent from the tenant applications to egress the underlay virtual adapter to the public cloud network. SNAT is used to modify the source IP address of outgoing packets (and, correspondingly, the destination IP address of incoming packets through an un-SNAT operation) from the IP addresses of the third party provided overlay network to the IP addresses of the public cloud network.

For instance, packets that are sent from tenant applications 250 in FIG. 2 through the network stack 230 and the overlay virtual adapter 235 to a destination in the public cloud network 260 are source network address translated by the overlay virtual adapter. Similarly, packets that are sent from tenant applications 250 in FIG. 3 through the network stack 230, port 330, MFE integration bridge 310, patch ports 341 and 342, the MFE transport bridge 315, and NIC port 370 to the pNIC 245 to a destination in the public cloud network 260 are source network address translated by the MFE integration bridge 310.

Each packet's source IP address is translated from the source address of the originating tenant application to the underlay IP address of the VM 210. Un-SNAT operation is performed (as discussed further below by reference to FIG. 8) on the return traffic from underlay endpoints back to the logical IP address of the tenant applications.

Figure 7:
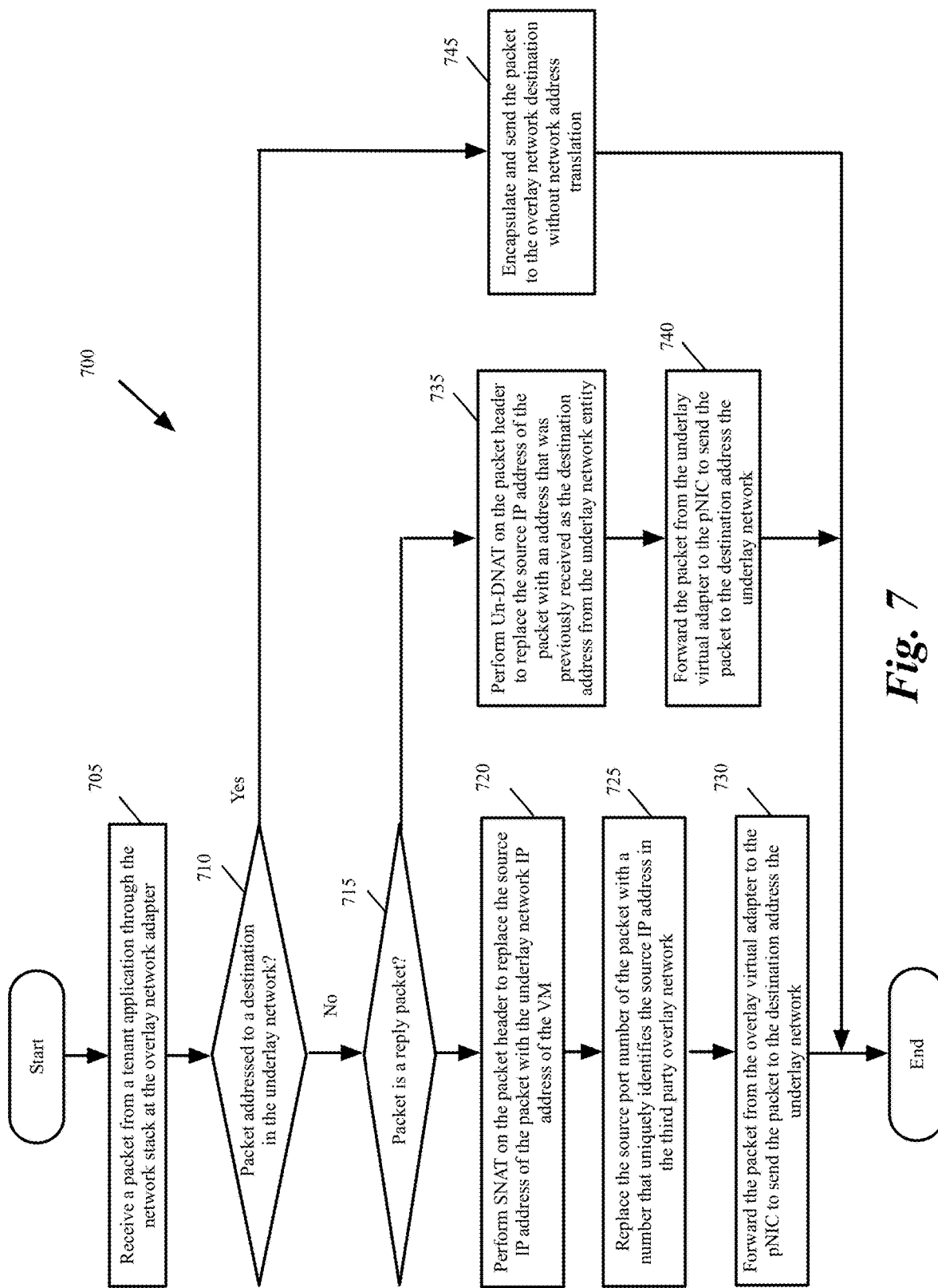
FIG. 7 conceptually illustrates a process for source address translation of the packets that are sent from the tenant applications from a third party overlay network to a public cloud underlay network in some embodiments.

FIG. 7 conceptually illustrates a process 700 for source address translation of the packets that are sent from the tenant applications from a third party overlay network to a destination in the public cloud underlay network in some embodiments. The process shows the details of SNAT and un-DNAT operations discussed above by reference to in FIGS. 6A-6B. The packets that are subject to SNAT are packets that are initiated (i.e., are not reply packets) from the tenant application on the third party overlay network and are sent to destinations in the public cloud underlay network.

As shown, the process receives (at 705) a packet at the virtual adapter of the underlay network of the public cloud from the virtual adapter of the third party overlay network. For instance, the process in FIG. 2 receives a packet at the overlay virtual adapter 235 that is sent from a tenant application 250 through the network stack 230. Similarly, the process in FIG. 3 receives a packet at port 330 that is sent from a tenant application 250 through the network stack 230.

The process then determines (at 710) whether the packet is addressed to a destination IP address in the underlay network. If yes, the process proceeds to 745, which is described below. Otherwise, the process determines (at 715) whether the packet is a reply packet that a tenant application is sending in response to a previously received request from an entity in the underlay network address space. If yes, the process proceeds to 735, which is described below.

Otherwise, the process performs (at 720) SNAT on the packet header to replace the source IP address of the packet with the underlay network IP address of the VM. For instance, the MFE transport bridge 315 in FIG. 3 performs the SNAT operation. The process in some embodiments also replaces (at 725) the source port number of the packet with a number that uniquely identifies the source IP address in the third party overlay network. In order to send the reply packets to the correct destinations, some embodiments assign a unique number to each tenant application that uses the third party overlay network for the purpose of network address translation. This number is used to replace the source port of the packets that are sent to the underlay network. For the reply packets, this unique number is used during the un-SNAT operation to identify the IP address of the tenant application in the overlay network.

The process then forwards (at 730) the packet from the overlay virtual adapter to the pNIC to send the packet to the destination address in the underlay network. For instance, referring to FIG. 2, the process forwards the packet to the pNIC 245 to send to the underlay network destination. Also, referring to FIG. 3, the process forwards the packet from the MFE transport bridge 315 (which performed the SNAT operation) through the NIC port 370 to the 245 to send to the addressed entity in the service provider network 260. The process then ends.

When the packet addressed from a tenant application to an entity in the underlay network is a reply packet, the process performs (at 735) un-DNAT operation on the packet header to replace the source IP address of the packet with an address that was previously received as the destination address from the underlay network entity. For instance, the MFE transport bridge 315 in FIG. 3 performs the un-DNAT operation. The process then forwards (at 740) the packet to the pNIC to send to the destination entity in the underlay network. For instance, the process forwards the packet from the transport bridge 315 (which performed the un-DNAT operation) and the NIC port 370 to the pNIC 245 to forward the packet to the underlay network destination. The process then ends.

When a packet is received from a tenant application that is not addressed to a destination in the underlay network, the process encapsulates (at 745) and sends the packet to the overlay network destination without network address translation. For instance, the MFE integration bridge 310 in FIG. 3 encapsulates the packet and sends the packet through the overlay port 340, port 335, the MFE transport bridge 315, and NIC port 370 to the pNIC 245 to forward to the overlay network destination. The process then ends.

For applications hosted in the VM that underlay endpoints connect to, incoming traffic on the underlay logical interface that is not overlay traffic (i.e., the incoming packets that are not exchanged between entities on the third party overlay network) is subjected to destination network address translation (DNAT). DNAT is performed for the incoming traffic where the connection is originated from outside the VM. The destination address is translated to the logical IP address of the VIF. The corresponding return traffic is source address translated as described above by reference to FIG. 7. In some embodiments, the user is allowed to configure a list of applications hosted in the VM for which incoming traffic can be subjected to the source and destination network address translation.

Figure 8:
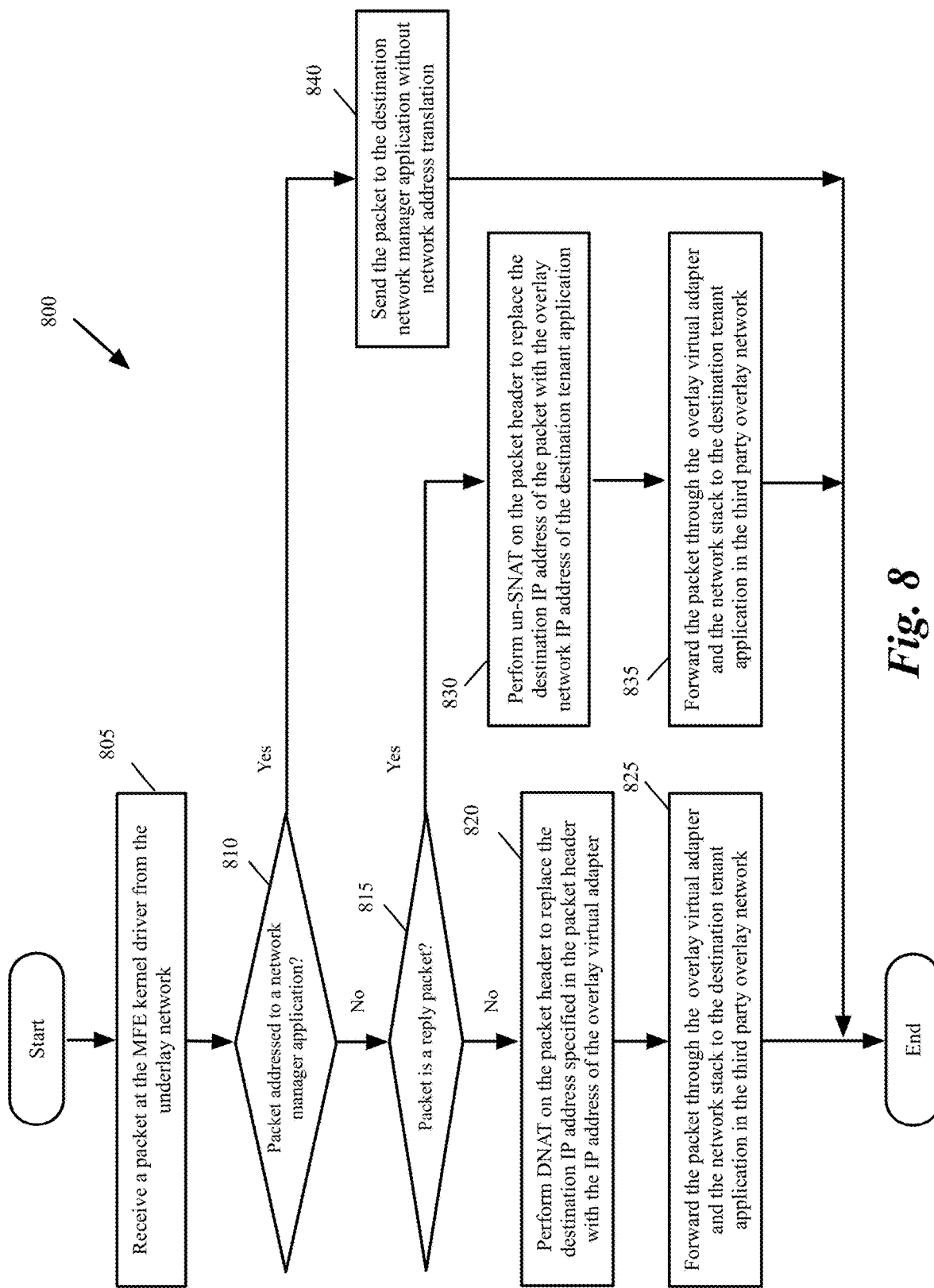
FIG. 8 conceptually illustrates a process for destination address translation of the packets that are sent from the public cloud underlay network to the tenant applications in a third party overlay network in some embodiments.

FIG. 8 conceptually illustrates a process 800 for destination address translation (DNAT) of the packets that are sent from the public cloud underlay network to the tenant applications in a third party overlay network in some embodiments. The process shows the details of DNAT and un-SNAT operations discussed above by reference to FIGS. 6A-6B. The packets that are subject to DNAT are packets that originate from an IP address of the underlay network and are sent to a tenant application on the third party overlay network.

As shown, the process receives (at 805) a packet at MFE kernel driver from the underlay network. For instance, the process receives a packet from the pubic cloud network 290 at the MFE kernel driver 215 or 395 in FIG. 2 or FIG. 3, respectively. The process then determines (at 810) whether the packet is addressed to a network manager application. If yes, the process proceeds to 840, which is described below.

Otherwise, the process determines (at 815) whether the packet is a reply packet that is sent by an entity in the underlay network in response to a request by a tenant application on the overlay network. If yes, the process proceeds to 830, which is described below.

Otherwise, the process performs (at 820) DNAT on the packet. For instance, the MFE transport bridge 315 in FIG. 3 performs the DNAT operation. For applications hosted in the VM that underlay endpoints connect to, the incoming traffic on the underlay logical interface that is not overlay traffic is subjected to DNAT. For such incoming traffic where the connection is originated from outside the VM, DNAT is performed on the packets by replacing the destination address specified in the packet header by the logical IP address of the overlay virtual adapter. Un-DNAT operation is performed on the corresponding return traffic (as described above by reference to FIG. 7). Some embodiments configure a list of applications hosted in the VM for which the incoming traffic can be subjected to DNAT and un-DNAT operations. The process then forwards (at 825) the packet through the overlay virtual adapter and the network stack to the destination tenant application in the third party overlay network. For instance, the MFE transport bridge that performs the DNAT operation sends the packet through patch ports 342 and 341 to the MFE integration bridge 310. The MFE integration bridge 310 in turn sends the packet through port 330 (which is the overlay virtual adapter) through the network stack 230 to the destination tenant application 250. The process then ends.

When the packet that is addressed to a tenant application from an underlay network entity is a reply packet, the process performs (at 830) un-SNAT operation on the packet. For instance, the MFE transport bridge 315 in FIG. 3 performs the un-SNAT operation. The un-SNAT operation in some embodiments includes using the destination port number specified in the packet header to identify the destination tenant application. As described above by reference to operations 720 and 725, a number that uniquely identifies a tenant application is used as the source port number for the packets that are sent from the tenant applications to the underlay network destinations. The reply packets, therefore, use this number as the destination port number in the reply packets. The MFE kernel driver uses this unique number in the reply packets to identify the destination tenant application.

The un-SNAT operation replaces the destination IP address specified in the packet header with the identified IP address of the destination tenant application. The process then forwards the packet through the overlay virtual adaptor and the network stack to the destination tenant application in the overlay network. For instance, the MFE transport bridge that performs the un-SNAT operation sends the packet through patch ports 342 and 341 to the MFE integration bridge 310. The MFE integration bridge 310 in turn sends the packet through port 330 (which is the overlay virtual adapter) through the network stack 230 to the destination tenant application 250. The process then ends.

When the packet that is received from the underlay network is not addressed to a tenant application, the process forwards (at 840) the packet to the destination network manager application without network address translation or decapsulation. The process then ends.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 920, a read-only memory (ROM) 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 920, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 920 is a read-and-write memory device. However, unlike storage device 935, the system memory is a volatile read-and-write memory, such as random access memory. The system memory stores some of the instructions and data that the processor needs at runtime. In some embodiments, the invention's processes are stored in the system memory 920, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), an Intranet, or a network of networks, such as the Internet. Any or all components of electronic system 900 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A physical host machine of a public cloud datacenter, the physical host machine comprising:
    a set of processing units for executing instructions stored in non-transitory machine readable media;
    a physical network interface card (PNIC); and
    a non-transitory machine readable medium storing virtual machine (VM) that executes
    (i) first and second applications,
    (ii) a network stack that differentiates between traffic for a logical overlay network and traffic for a physical underlay network of the public cloud datacenter, and
    (iii) a managed forwarding element (MFE) having first and second interfaces,
    wherein the first application sends data messages through the PNIC to the logical overlay network by sending the data messages to the network stack, which routes the data messages from the first application to the first interface of the MFE,
    wherein the second application sends data messages through the PNIC to the physical underlay network by sending the data messages to the network stack, which routes the data messages from the second application to the second interface of the MFE.

2. The physical host machine of claim 1, wherein the first application is a network management agent for configuring the MFE to implement a logical network, wherein the second application is an application of a tenant of the public cloud datacenter.

3. The physical host machine of claim 1, wherein the MFE executing on the VM connects to a software switch of the host machine that is configured and managed by a provider of the public cloud datacenter.

4. The physical host machine of claim 1, wherein the first interface is a virtual interface (VIF) and the second interface is a virtual tunnel endpoint (VTEP) for the overlay network.

5. The physical host machine of claim 4, wherein the host machine is a first host machine and the MFE executing on the VM is an instance of open vSwitch (OVS), wherein (i) other VMs operating on other host machines of the public cloud datacenter also execute instances of OVS and (ii) other instances of OVS execute in virtualization software of a set of host machines of a private datacenter, wherein the VM communicates with VMs executing on the set of host machines of the private datacenter.

6. The physical host machine of claim 1, wherein the MFE comprises (i) an integration bridge connected to the first interface and (ii) a transport bridge connected to the second interface and to the integration bridge.

7. The physical host machine of claim 1, wherein the public cloud datacenter does not allow access to a virtualization software of the host machine by the VM and the first and second applications.

8. The physical host machine of claim 1, wherein the public cloud datacenter does not provide more than one namespace to the VM.

9. The physical host machine of claim 1, wherein the host machine executes a virtualization software, wherein the VM executes a guest operating system that does not have access to the virtualization software of the host machine and does not provide multiple namespaces.

10. A non-transitory machine readable medium storing a virtual machine (VM) for execution by a processing unit of a physical host machine of a public cloud datacenter, the VM comprising:
    first and second applications, a network stack that differentiates between traffic for a logical overlay network and traffic for a physical underlay network of the public cloud datacenter, and a managed forwarding element (MFE) having first and second interfaces;
    wherein the first application sends data messages through a physical network interface card (PNIC) of the host machine to the logical overlay network by sending the data messages to the network stack, which routes the data messages from the first application to the first interface of the MFE,
    wherein the second application sends data messages through the PNIC to the physical underlay network by sending the data messages to the network stack, which routes the data messages from the second application to the second interface of the MFE.

11. The non-transitory machine readable medium of claim 10, wherein the first application is a network management agent for configuring the MFE to implement a logical network, wherein the second application is an application of a tenant of the public cloud datacenter.

12. The non-transitory machine readable medium of claim 10, wherein the MFE executing on the VM connects to a software switch of the host machine that is configured and managed by a provider of the public cloud datacenter.

13. The non-transitory machine readable medium of claim 10, wherein the first interface is a virtual interface (VIF) and the second interface is a virtual tunnel endpoint (VTEP) for the overlay network.

14. The non-transitory machine readable medium of claim 10, wherein the MFE comprises (i) an integration bridge connected to the first interface and (ii) a transport bridge connected to the second interface and to the integration bridge.

15. The non-transitory machine readable medium of claim 10, wherein the public cloud datacenter does not allow access to a virtualization software of the host machine by the VM and the first and second applications.

16. The non-transitory machine readable medium of claim 15, wherein the host machine is a first host machine and the MFE executing on the VM is an instance of open vSwitch (OVS), wherein (i) other VMs operating on other host machines of the public cloud datacenter also execute instances of OVS and (ii) other instances of OVS execute in virtualization software of a set of host machines of a private datacenter, wherein the VM communicates with VMs executing on the set of host machines of the private datacenter.

17. The non-transitory machine readable medium of claim 10, wherein the public cloud datacenter does not provide more than one namespace to the VM.

18. The non-transitory machine readable medium of claim 10, wherein the host machine executes a virtualization software, wherein the VM executes a guest operating system that does not have access to the virtualization software of the host machine and does not provide multiple namespaces.

* * * * *